Aug. 4, 1953
A. E. DENTLER
2,647,744
SHOCK ABSORBER FOR RAILWAY CAR TRUCKS
Filed Nov. 1, 1951
2 Sheets-Sheet 1
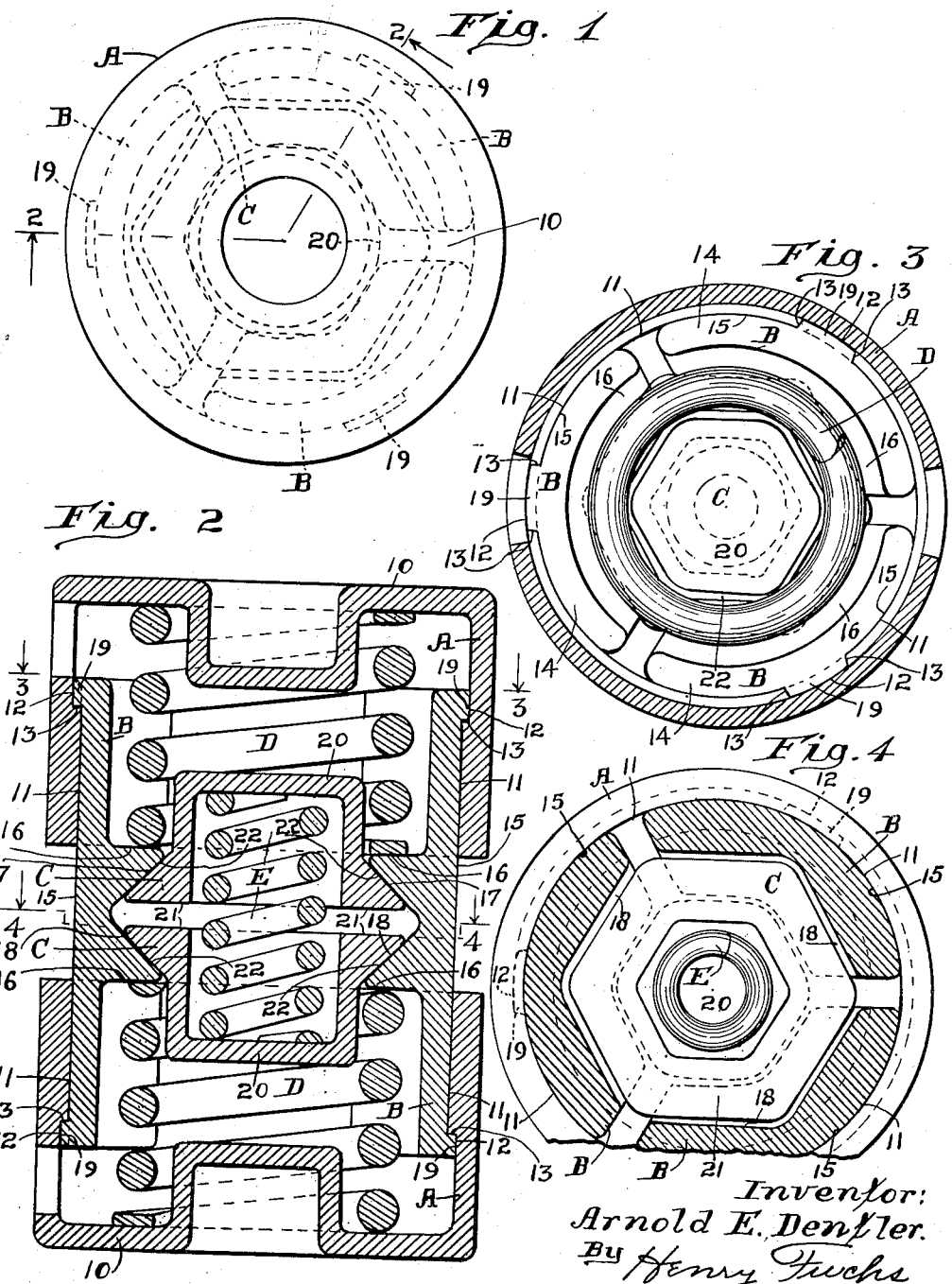
Inventor:
Arnold E. Dentler.
By Henry Fuchs
Atty.

Aug. 4, 1953  A. E. DENTLER  2,647,744
SHOCK ABSORBER FOR RAILWAY CAR TRUCKS
Filed Nov. 1, 1951  2 Sheets-Sheet 2
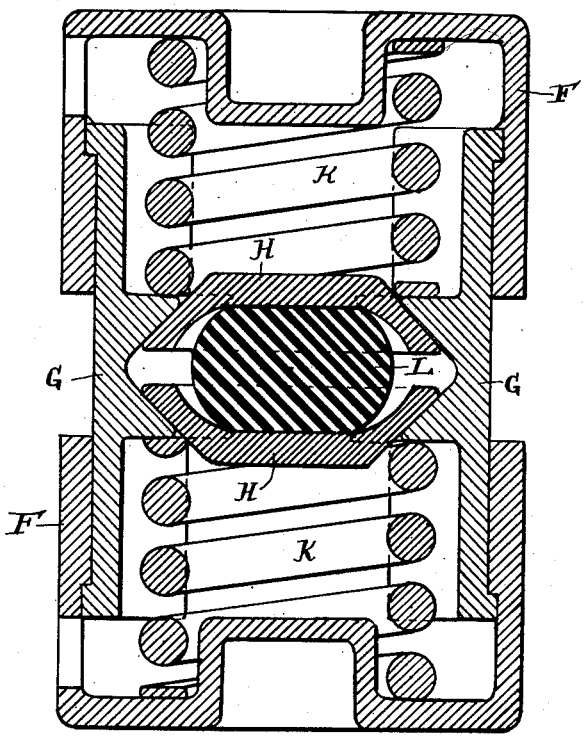
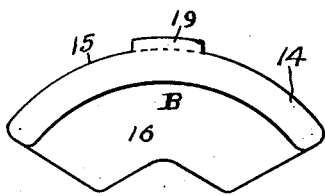
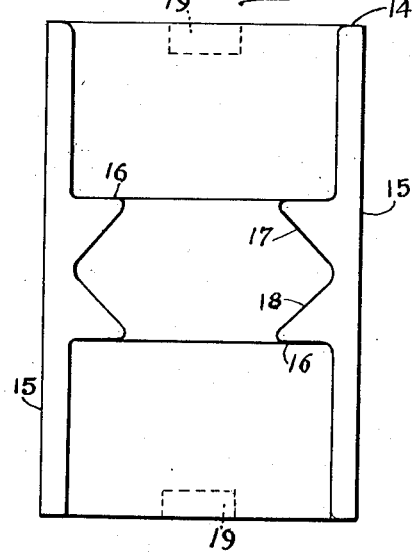
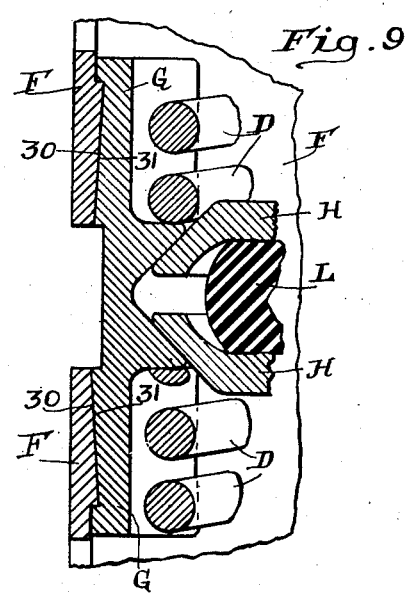
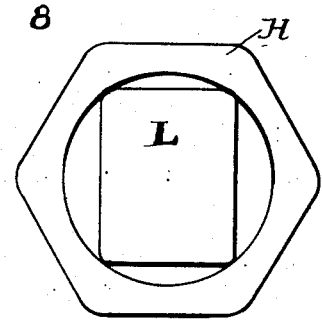
Inventor:
Arnold E. Dentler.
By Henry Fuchs Patented Aug. 4, 1953

2,647,744

UNITED STATES PATENT OFFICE 2,647,744

SHOCK ABSORBER FOR RAILWAY CAR TRUCKS

Arnold E. Dentler, Western Springs, Ill., assignor to W. H. Miner, Inc., Chicago, Ill., a corporation of Delaware Application November 1, 1951, Serial No. 254,385

6 Claims. (Cl. 267—9)

This invention relates to improvements in shock absorbers adapted for use as snubbing devices in connection with truck springs of railway cars.

One object of the invention is to provide a simple and efficient snubber, comprising few parts, which may be cheaply and economically manufactured, and readily applied in place of one or more of the usual spring units of a cluster of railway car truck springs.

A more specific object of the invention is to provide a friction shock absorber, functioning as a snubbing device for truck springs of railway cars, comprising a pair of friction casings movable toward and away from each other lengthwise of the mechanism, a set of friction shoes in sliding frictional engagement with the interior walls of the casings, a pair of wedges engaged with the shoes for spreading the same apart and forcing the same against the casing walls, yielding means for pressing the wedges against the shoes, and spring means reacting between the casings and shoes for yieldingly resisting relative approach of the casings.

Other objects of the invention will more clearly appear from the description and claims hereinafter following.

In the accompanying drawings forming a part of this specification, Figure 1 is a top plan view of the improved shock absorber. Figure 2 is a vertical sectional view on two intersecting planes disposed at an angle of 120 degrees to each other, said view being taken substantially on the line 2—2 of Figure 1. Figure 3 is a horizontal sectional view, corresponding substantially to the line 3—3 of Figure 2. Figure 4 is a broken, horizontal sectional view, corresponding substantially to the line 4—4 of Figure 2. Figure 5 is a top plan view of one of the friction shoes of the improved shock absorber illustrated in Figures 1 to 4 inclusive. Figure 6 is an elevational view of Figure 5, looking upwardly in said figure. Figure 7 is a view similar to Figure 2, showing another embodiment of the invention. Figure 8 is a top plan view of the bottom wedge and the rubber block shown in Figure 7. Figure 9 is a broken view similar to Figure 2, illustrating still another embodiment of the invention.

Referring first to the embodiment of the invention illustrated in Figures 1 to 6 inclusive, my improved friction shock absorber comprises broadly top and bottom friction casings A—A, three friction shoes B—B—B, top and bottom wedges C—C, top and bottom springs D—D reacting between the casings and shoes, and an additional spring E reacting between the top and bottom wedges C—C.

The top and bottom casings A—A are of the same design, each casing A being in the form of a tubular shell of cylindrical cross section, closed at one end by a transverse wall 10 and open at the other end. The transverse wall 10 of the top casing A closes the top end of the same and the transverse wall 10 of the bottom casing closes the lower end of the latter. The cylindrical portion or shell section of each casing A presents a lengthwise extending, interior, friction surface 11, which is of cylindrical contour. The portion of the wall of the shell section of each casing, which presents the cylindrical friction surface 11, is thickened as shown most clearly in Figure 1. The thickened portion of the wall of the shell portion of each casing A is provided with seats or notches 12 at the inner end of the friction surface of said casing, the seats or notches being three in number and being spaced 120 degrees apart. The seats or notches 12—12—12 provide horizontal stop shoulders 13—13—13 at their inner ends with which retaining means, hereinafter described, on the friction shoes B are engageable.

The friction shoes B—B—B are all of the same design, and together form a friction means or unit. Each shoe B comprises a transversely curved plate member 14, having a lengthwise extending, transversely curved friction surface 15 on the outer side. On the inner side, midway between the ends thereof, each shoe is inwardly enlarged to provide an inwardly extending flange or wedge projection 16. The wedge projection 16 of each shoe is cut out to provide a V-shaped opening presenting top and bottom, opposed wedge faces 17 and 18 which converge in lateral outward direction. As shown in Figure 4, each wedge face 17 and 18 is of V-shape in transverse direction. The three shoes B—B—B are arranged in annular series with their upper and lower ends extending into the top and bottom friction casings A—A, respectively, and slidingly engaging the friction surfaces 11—11 thereof.

Each shoe B has outwardly projecting top and bottom lugs 19—19 thereon, which are located centrally between the sides thereof. The lugs 19—19, 19—19, and 19—19 of the three shoes B—B—B project into the seats 12—12—12 and 12—12—12 of the top and bottom casings A—A and shoulder against the stop shoulders 13—13—13 and 13—13—13 to limit separation of the casings A—A lengthwise of the mechanism and hold the mechanism assembled.

The top and bottom wedges C—C are of similar design, each being in the form of a cup-shaped cap, closed at the outer end by a transverse wall 20 and open at the inner end. The wedges C—C are preferably of hexagonal outline, as shown. Each wedge C has an outwardly projecting, laterally extending flange 21 at its inner end, presenting three transverse V-shaped wedge faces 22—22—22. The top wedge C has the wall 20 at the top end of the cap portion thereof and the wedge faces 22—22—22 of said wedge face upwardly and are in wedging engagement with the top wedge faces 17—17—17 of the shoes B—B—B and the bottom wedge C has the wall 20 at its lower end and the wedge faces 22—22—22 of said cap face downwardly and are in wedging engagement with the bottom wedge faces 18—18—18 of said shoes B—B—B.

Each spring D is in the form of a helical coil of relatively large diameter. The top spring D is arranged within the top casing A surrounding the upper portion of the caplike top wedge C and has its top and bottom ends bearing respectively on the top wall 10 of the top casing A and the top sides of the flanges 16—16—16 of the shoes B—B—B.

The bottom spring D is arranged within the bottom casing A, surrounding the lower portion of the lower caplike wedge C and has its top and bottom ends bearing respectively on the bottom wall 10 of the bottom casing A and the underneath sides of the flanges 16—16—16 of the shoes B—B—B.

The spring E, which is also in the form of a helical coil, is housed within the caplike wedges C—C and has its top and bottom ends bearing on the walls 20—20 of said top and bottom wedges C—C, respectively. This spring E is under initial compression, thereby forcing the wedges C—C against the wedge faces of the shoes B—B—B and pressing the latter against the friction surfaces of the top and bottom casings A—A.

My improved shock absorber preferably replaces one or more of the spring units of a truck spring cluster, being interposed between the top and bottom spring plates of said cluster.

The operation of my improved shock absorber is as follows: Upon the spring cluster of the truck of a railway car being compressed between the spring follower plates of the cluster, the springs D—D are compressed and the shoes B—B—B and casings A—A are moved lengthwise relatively to each other, thus providing frictional resistance which is substantially constant throughout the compression stroke of the mechanism. The frictional resistance thus provided effectively snubs the action of the truck springs.

During recoil of the truck springs, the springs D—D expand, returning the parts of the mechanism to the normal full release position shown in Figure 2.

The embodiment of the invention illustrated in Figures 7 and 8 comprises friction casings F—F, three shoes G—G—G, wedges H—H, and springs K—K, which are identical with the casings A—A, three shoes B—B—B, wedges C—C, springs D—D of the construction shown in Figures 1 to 6 inclusive, and a rubber element L, which is in the form of a block of originally substantially rectangular shape. The element L is interposed between the wedges H—H and is under initial compression, thus assuming the distorted shape shown in Figure 7.

Referring next to the embodiment of the invention illustrated in Figure 9, the construction is identical with that shown in Figures 7 and 8 with the exception that the casings F—F are of hexagonal transverse cross section and have inwardly converging friction surfaces 30 and the shoes G—G—G have inclined friction surfaces 31, which cooperate with the surfaces 30. Due to this tapered and inclined arrangement of the friction surfaces, the shoes are forced laterally inwardly toward the central longitudinal axis of the mechanism during the compression stroke, thereby forcing the wedges H—H together and additionally compressing the rubber block L. Increasing frictional resistance is thus provided during the compression stroke of the mechanism illustrated in Figure 9.

I claim:

1. In a friction shock absorber, the combination with a pair of friction casings, closed at their outer ends, and having interior friction surfaces at their inner ends; of a plurality of lengthwise extending friction shoes having their opposite ends telescoped within said casings, respectively, in sliding frictional engagement with the friction surfaces of the latter; springs within said casings at opposite ends of the mechanism, each spring being buttressed at one end against said shoes and at the other end against the closed end of one of said casings; a pair of wedge caps in wedging engagement with said shoes; and yielding means between said caps for forcing said caps apart.

2. In a friction shock absorber, the combination with a top casing; of a bottom casing, said top casing being closed at its upper end and said bottom casing being closed at its lower end; a plurality of friction shoes arranged lengthwise of the mechanism and having their opposite ends slidingly telescoped within said casings in frictional engagement with the interior walls of the latter, said shoes having laterally inwardly extending enlargements between the ends thereof, each of said enlargements presenting top and bottom, interior wedge faces; top and bottom wedge caps, said top cap having wedge faces engaging with said top wedge faces of said enlargements of said shoes, and said bottom cap having wedge faces in wedging engagement with said bottom wedge faces of said enlargements; top and bottom springs within said casings, said top spring bearing on said closed end of said top casing and the upper sides of said enlargements of said shoes, and said bottom spring bearing on said closed end of said bottom casing and the underneath sides of said enlargements of said shoes; and yielding means under initial compression contained within and reacting between said top and bottom wedge caps to force the same apart lengthwise of the mechanism.

3. In a friction shock absorber, the combination with a pair of friction casings, closed at their outer ends, and having interior friction surfaces at their inner ends; of a plurality of lengthwise extending friction shoes having their opposite ends telescoped within said casings, respectively, in sliding frictional engagement with the friction surfaces of the latter; springs within said casings at opposite ends of the mechanism, each spring being buttressed at one end against said shoes and at the other end against the closed end of one of said casings; a pair of wedge caps in wedging engagement with said shoes; and a spring between said caps for forcing said caps apart.

4. In a friction shock absorber, the combination with a top casing; of a bottom casing, said top casing being closed at its upper end and said bottom casing being closed at its lower end; a plurality of friction shoes arranged lengthwise of the mechanism and having their opposite ends slidingly telescoped within said casings in frictional engagement with the interior walls of the latter, said shoes having laterally inwardly extending enlargements between the ends thereof, each of said enlargements presenting top and bottom, interior wedge faces; top and bottom wedge caps, said top cap having wedge faces engaging with said top wedge faces of said enlargements of said shoes, and said bottom cap having wedge faces in wedging engagement with said bottom wedge faces of said enlargements; top and bottom springs within said casings, said top spring bearing on said closed end of said top casing and the upper sides of said enlargements of said shoes, and said bottom spring bearing on said closed end of said bottom casing and the underneath sides of said enlargements of said shoes, and a spring under initial compression contained within and reacting between said top and bottom wedge caps to force the same apart lengthwise of the mechanism.

5. In a friction shock absorber, the combination with a pair of friction casings, closed at their outer ends, and having interior friction surfaces at their inner ends; of a plurality of lengthwise extending friction shoes having their opposite ends telescoped within said casings, respectively, in sliding frictional engagement with the friction surfaces of the latter; springs within said casings at opposite ends of the mechanism, each spring being buttressed at one end against said shoes and at the other end against the closed end of one of said casings; a pair of wedge caps in wedging engagement with said shoes; and a rubber block between said caps for forcing said caps apart.

6. In a friction shock absorber, the combination with a top casing; of a bottom casing, said top casing being closed at its upper end and said bottom casing being closed at its lower end; a plurality of friction shoes arranged lengthwise of the mechanism and having their opposite ends slidingly telescoped within said casings in frictional engagement with the interior walls of the latter, said shoes having laterally inwardly extending enlargements between the ends thereof, each of said enlargements presenting top and bottom, interior wedge faces; top and bottom wedge caps, said top cap having wedge faces engaging with said top wedge faces of said enlargements of said shoes, and said bottom cap having wedge faces in wedging engagement with said bottom wedge faces of said enlargements; top and bottom springs within said casings, said top spring bearing on said closed end of said top casing and the upper sides of said enlargements of said shoes, and said bottom spring bearing on said closed end of said bottom casing and the underneath sides of said enlargements of said shoes; and a rubber block under initial compression contained within and reacting between said top and bottom wedge caps to force the same apart lengthwise of the mechanism.

ARNOLD E. DENTLER.

References Cited in the file of this patent

UNITED STATES PATENTS

| Number | Name | Date |
| --- | --- | --- |
| 1,378,868 | Johnson | May 24, 1921 |
| 1,883,049 | Sproul | Oct. 18, 1932 |
| 2,097,523 | Hedgcock et al. | Nov. 2, 1937 |
| 2,520,845 | Lehrman et al. | Aug. 29, 1950 |